United States Patent
Ketterle

(10) Patent No.: US 11,256,230 B2
(45) Date of Patent: Feb. 22, 2022

(54) AUTOMATED CONFIGURATION OF AN INDUSTRIAL CONTROLLER BY MEANS OF A VERIFICATION TOKEN

(71) Applicant: CODESYS Holding GmbH, Kempten (DE)

(72) Inventor: Kevin Ketterle, Boerwang (DE)

(73) Assignee: CODESYS HOLDING GMBH, Kempten (DE)

( * ) Notice: Subject to any disclaimer, the term of this patent is extended or adjusted under 35 U.S.C. 154(b) by 274 days.

(21) Appl. No.: 16/400,453

(22) Filed: May 1, 2019

(65) Prior Publication Data
US 2019/0346824 A1   Nov. 14, 2019

(30) Foreign Application Priority Data

May 9, 2018   (EP) .................................... 18171418

(51) Int. Cl.
| | | |
|---|---|---|
| *G05B 19/418* | (2006.01) | |
| *G05B 19/408* | (2006.01) | |
| *G05B 19/406* | (2006.01) | |

(52) U.S. Cl.
CPC ....... *G05B 19/4083* (2013.01); *G05B 19/406* (2013.01); *G05B 19/4185* (2013.01)

(58) Field of Classification Search
CPC ............. G05B 19/4083; G05B 19/406; G05B 19/4185
USPC ........................................................... 700/1
See application file for complete search history.

(56) References Cited

U.S. PATENT DOCUMENTS

| | | | | |
|---|---|---|---|---|
| 2009/0083843 A1* | 3/2009 | Wilkinson, Jr. | ...... | H04L 9/3234 726/9 |
| 2013/0024542 A1 | 1/2013 | Keller et al. | | |
| 2013/0268097 A1* | 10/2013 | McKelvey | ............. | G05B 19/05 700/83 |
| 2014/0280528 A1* | 9/2014 | Brandes | ............... | G05B 19/056 709/204 |
| 2014/0336786 A1* | 11/2014 | Asenjo | .................... | G06F 3/048 700/17 |
| 2015/0142138 A1* | 5/2015 | Mohan | ................. | G05B 19/048 700/20 |

(Continued)

OTHER PUBLICATIONS

Borisov "A Novel Approach for User Authentication to Industrial Components Using QR Codes", 2015, IEEE, p. 61-66. (Year: 2015).*

(Continued)

*Primary Examiner* — Hien D Khuu
(74) *Attorney, Agent, or Firm* — Steven J. Grossman; Grossman, Tucker, Perreault & Pfleger PLLC

(57) ABSTRACT

A method for an automated configuration of an industrial controller unit comprises sending, from a server system, an instruction message and a verification token to a client device via a first communication network. The instruction message comprises information pertaining to a modification of an industrial controller unit, and the verification token pertains to a completed modification of the industrial controller unit. The method further comprises receiving, at the server system, a verification message pertaining to the verification token, and providing, from the server system, an industrial program and/or a parameter for an industrial program to the industrial controller unit via a second communication network, in response to receiving the verification message.

10 Claims, 7 Drawing Sheets

(56) References Cited

U.S. PATENT DOCUMENTS

| | | |
|---|---|---|
| 2015/0287318 A1 | 10/2015 | Nair et al. |
| 2016/0274552 A1* | 9/2016 | Strohmenger ......... G06Q 10/06 |
| 2017/0220012 A1 | 8/2017 | Hart et al. |
| 2017/0277920 A1* | 9/2017 | DeYoung ............. G05B 19/042 |

OTHER PUBLICATIONS

Stouffer et al. "Guide to Industrial Control Systems (ICS) Security", 2011, NIST, SP 800-82, p. 1-1:6:32. (Year: 2011).*
European Search Report related to corresponding EP Application No. 18171418.9, dated Nov. 21, 2018.

\* cited by examiner

AUTOMATED CONFIGURATION OF AN INDUSTRIAL CONTROLLER BY MEANS OF A VERIFICATION TOKEN

FIELD

The present invention relates to the field of industrial control, in particular to methods and systems for configuring or re-configuring industrial controller units in an industrial control environment or industrial control network.

BACKGROUND

Industrial control networks are ubiquitous in many areas of industry and manufacturing, and may comprise a plurality of industrial controller units, wherein each of the industrial controller units stores a designated control software program and possibly control parameters adapted to control a machinery or group of machinery connected to the respective industrial controller unit. Industrial controller units may be integrated into the machinery, or may be stand-alone control devices.

Industrial controller units may need to be configured with a designated control software program and control parameters upon commissioning of the respective industrial controller unit, for instance when a new industrial controller unit is added to an industrial control environment or when a new industrial controller unit replaces an industrial controller unit that has become dysfunctional. Regular maintenance operations on the industrial controller unit may also sometimes require a re-configuration of the industrial controller unit with a designated control software program and possibly corresponding control parameters.

In the prior art, updates or re-configurations of industrial controller units are often done manually, such as via re-programming, and new software or parameters may be uploaded to the industrial controller via a laptop computer or serial interface. In some industrial control environments, the industrial controller units are connected via a data network, and in this case the update may be performed remotely via the data network by accessing the individual industrial controller units one-by-one, and re-configuring them with their respective control software or control parameters.

However, in all these use cases, the update requires skilled user interaction, either locally or remotely. As a result, an update can be costly and time-consuming. In addition, even well-trained users sometimes make mistakes, and there is always the risk that an industrial controller unit is updated with the wrong industrial program or parameters, which may lead to manufacturing down time, or even damage to the machinery.

What is needed is a method and system for a controller update that can be more easily administrated and less time-consuming and error-prone.

SUMMARY

This objective is achieved with a method for an automated configuration of an industrial controller unit, a server system, and a client device.

In a first aspect, a method for an automated configuration of an industrial controller unit comprises: sending, from a server system, an instruction message and a verification token to a client device via a first communication network, wherein the instruction message comprises information pertaining to a modification of an industrial controller unit, and wherein the verification token pertains to a completed modification of the industrial controller unit; receiving, at the server system, a verification message pertaining to the verification token; and providing, from the server system, an industrial program and/or a parameter for an industrial program to the industrial controller unit via a second communication network, in response to receiving the verification message.

In typical examples, the client device may be used by operating personnel entrusted with the commissioning and/or maintenance of the industrial controller unit. By means of the instruction message, the operating personnel may be provided with tailored instructions that list the work steps that need to be done to modify the respective industrial controller unit.

According to the invention, the operating personnel at the client device may further be provided with the verification token, which may be generated by the server system alongside the instruction message. The verification token can be used as a token to identify the respective industrial controller unit and the modifications that need to be applied to the respective industrial controller unit. Once the operating personnel has completed the modification of the industrial controller unit, the verification token may be employed to generate a verification message, which is sent to and received at the server system. In response to receiving the verification message, the server system may provide the industrial program and/or parameter for an industrial program to the industrial controller unit via the second communication network, thereby finalizing the commissioning or update of the industrial controller unit.

As an advantage, the method according to the present invention may allow to provide the modified industrial controller unit with its designated industrial program and/or designated control parameters automatically, in response to receiving the verification message.

Providing the industrial program and/or the parameters for the industrial program automatically in response to receiving the verification message saves time for the operating personnel. Moreover, it significantly reduces the risk that the operating personnel may provide the industrial controller unit with inappropriate software or parameters, which could result in manufacturing downtime or even damage to the machinery.

As an additional advantage, the personnel entrusted with the modification of the industrial controller unit does not need to have expert knowledge about the corresponding industrial control program and/or parameters required to operate the industrial controller unit. Moreover, the operating personnel may not even need access to the industrial program and/or parameters.

The techniques of the present invention are particularly advantageous when a large number of industrial controller units need to be added to an industrial control environment, or need to be replaced in an industrial control environment.

The modification of the industrial controller unit, in the context of the present invention, may relate to any operating step or sequence of steps that can be applied to the industrial controller unit, such as by operating personnel.

For instance, the modification of the industrial controller unit comprises commissioning the industrial controller unit, maintaining the industrial controller unit, or exchanging the industrial controller unit with another industrial controller unit.

In the context of the present disclosure, the modification of the industrial controller unit may exclude the subsequent steps of providing the industrial controller unit with the industrial program and/or parameter for the industrial program in response to receiving the verification message.

An instruction message, in the context of the present invention, may relate to instructions that specify the step or sequence of steps required for the modification, such as in terms of a user instruction for the operating personnel.

In particular, the instruction message may be a human-readable message. As an example, the instruction message may comprise lexicographic characters and/or pictograms.

In other examples, the instruction message may be a message that can be converted into a human-readable message.

A completed modification, in the context of the present disclosure, may relate to a modification in which all the steps prescribed in the instruction message have been applied to the industrial controller unit.

The client device may relate to any device that may be adapted to receive the instruction message and the verification token from the server system. For instance, the client device may be a wireless handheld device used by the operating personnel in commissioning or maintaining the industrial controller unit, such as a tablet computer or mobile phone.

The first communication network, in the context of the present disclosure, may be any wired or wireless network that allows the client device to receive the instruction message and the verification token from the server system. In some examples, the first communication network may comprise a wired telecommunication network, or wireless telecommunication network and/or the internet.

The second communication network may be any wired or wireless network that allows the server system to communicate with the industrial controller unit. In some examples, the second communication network may comprise a wired or wireless communication network, the internet, or a designated industrial control network, such as a field bus network.

In some examples, the second communication network is different from the first communication network. In other examples, the second communication network is at least partially identical to the first communication network.

The verification message, in the context of the present disclosure, may be any message adapted to signal to the server system the completed modification of the industrial controller unit. The verification message may be generated based on or employing the verification token received from the server system.

According to an example, the verification message is received from the client device. For instance, the operating personnel may trigger the client device to send the verification message to the server system.

In other examples, the verification message is received from the industrial controller unit. For instance, the industrial controller unit may automatically generate the verification message in response to a completed modification. Alternatively, the operating personnel may trigger the industrial controller unit to send the verification message.

According to an example, the method further comprises receiving, at the server system, an identification message pertaining to an identity of the industrial controller unit.

The identification message may assist the server system to identify the correct industrial program and/or parameter for the industrial program to be sent to the industrial controller unit.

In some examples, the identification message may be part of the verification message. In other examples, the identification message may be a message separate and distinct from the verification message.

According to an embodiment, the identification message may comprise a barcode, in particular a one-dimensional barcode or a two-dimensional barcode.

For instance, the industrial controller unit may comprise a two-dimensional barcode printed on its housing, wherein the two-dimensional barcode comprises an identification of the industrial controller unit. Operating personnel may scan the two-dimensional barcode off the industrial controller unit, such as by means of the client device. The operating personnel may then send the identification message to the server system, wherein the identification message comprises a representation of the scanned two-dimensional barcode, thereby allowing the server system to identify the respective industrial controller unit.

In particular, the method may comprise providing the industrial program and/or the parameter for the industrial program to the industrial controller unit only in response to receiving the identification message.

In some examples, the identification message is received from the client device.

In other examples, the identification message may be received from the industrial controller unit.

In some examples, the techniques according to the present invention allow to send an instruction message and a verification token to the client device only upon successful authentication or authorization. This may ensure that only authorized personnel are permitted to update or configure the industrial controller unit with the respective industrial program and/or parameter for the industrial program.

According to an embodiment, the method hence further comprises verifying an authorization, and sending the instruction message and/or the verification token to the client device only upon verifying the authorization.

In some examples, the authorization may be provided by the client device itself.

However, in other examples, a third party different from the operating personnel holding the client device may provide the authorization. It is a particular advantage of the techniques according to the present invention that the operating personnel installing or maintaining the industrial controller unit may not necessarily need to have the authorization, and in fact may be precluded from having the authorization. Rather, the authorization to send the instruction message and the verification token may come from a central management functionality.

According to an embodiment, the method further comprises detecting an operating state of the industrial controller unit, and sending the instruction message and/or the verification token to the client device in response to detecting the operating state.

In particular, the instruction message and/or the verification token may be sent to the client device automatically in response to detecting the operating state.

An operating state, in the context of the present disclosure, may refer to any external or internal state of the industrial controller unit, such as a malfunction. The techniques according to the embodiment allow to automatically react to operating states, such as malfunctions, and to send out the instruction message and the verification token to operating personnel automatically in case such a malfunction is detected.

A verification token, in the context of the present disclosure, may designate any message or software piece that can be associated with the respective instruction message and/or industrial controller unit, and allows for the generation of the verification message, to be sent to the server system.

For instance, in some examples, the verification token comprises a bar code, such as a one-dimensional bar code or a two-dimensional bar code.

The verification message may hence be generated by scanning the bar code.

In other examples, the verification token may comprise a text message. The verification message may be generated by responding to the text message.

An industrial controller unit, in the context of the present disclosure, may be any device adapted to run a control program, such as a compiled control program, for controlling a process. The process may be any industrial process or manufacturing process, or any other process which requires control, such as movement of a vehicle or control of lighting applications. Control, in the context of the disclosure, may involve the exchange of instructions and/or data between the industrial controller unit and the controlled process.

An industrial program, in the context of the present disclosure, may generally refer to any software or firmware adapted to run on the industrial controller unit, or parts of such software or firmware.

In particular, the industrial program may comprise or may consist of an industrial control program, or parts thereof. The industrial control program may be in the form of compiled to machine code, ladder logic, or in some other format, such as in the form of a high-level programming language source code.

The industrial program may also comprise or may consist of at least one application function for an industrial control program, or parts thereof.

An application function, in the sense of the present disclosure, may refer to any software or firmware adapted to perform a specific functionality in the context of an industrial control program. For instance, an application function may govern the way the control program logs measurement data on a remote database. Another application function may govern a sequence of manufacturing steps on the industrial controller unit, such a pertaining to a temperature control.

The parameters for the industrial program may be single parameters, or may comprise sets or groups of parameters.

The parameters for the industrial program, in accordance with the present disclosure, may be any parameters or variables required by the industrial program. For instance, a set of the parameters could constitute a recipe for a production process.

The parameters can be in any format, i.e., alphanumeric variables or Boolean, integer or real values. The parameters can also be or comprise data files.

According to an example, the industrial program and/or the parameter for the industrial program can be provided to the industrial controller automatically in response to receiving the verification message, i.e. without further user interaction. This may greatly facilitate and speed up the commissioning and/or configuring of industrial controller units when setting up or changing an industrial control environment.

According to an embodiment, the method may further comprise selecting the industrial program and/or the parameter for the industrial program in accordance with the verification message.

The techniques of the invention thereby allow to tailor the industrial program and/or the parameter for the industrial program specifically to the respective industrial controller unit, and to provide different industrial programs for different industrial controller units.

In particular, the industrial program and/or the parameter for the industrial program may be selected from a database.

The techniques of the invention have so far been described with reference to the server system that provides the instruction message and the verification token. However, the invention may likewise be characterized from the perspective of the client device, which provides an independent aspect of the invention.

In a second aspect, the invention hence relates to a method for an automated configuration of an industrial controller unit, comprising: receiving, at a client device, an instruction message and a verification token from a server system via a first communication network, wherein the instruction message comprises information pertaining to a modification of an industrial controller unit, and wherein the verification token pertains to a completed modification of the industrial controller unit; and sending, from the client device, a verification message to the server system, wherein the verification message pertains to the verification token.

The verification message may signal the completed modification of the industrial controller unit to the server system.

According to an embodiment, the method further comprises sending, from the client device, an identification message to the server system, wherein the identification message pertains to an identity of the industrial controller unit.

For instance, the operating personnel may employ the client device to input and send to the server system an identification number that the operating personnel may have read from the housing of the industrial controller unit.

Alternatively, the method may comprise triggering the controller unit to provide an identification message to the server system, wherein the identification message pertains to an identity of the industrial controller unit.

For instance, the operating personnel may trigger the controller unit to automatically send an identification number to the server system via the second communication network, such as when the modification of the industrial controller unit has been completed.

The invention further relates to a computer program or to a computer program product comprising computer-readable instructions, wherein the instructions, when read on a computer device, implement on the computer device a method with some or all of the features described above.

In the first aspect, the invention additionally relates to a server system, comprising a server instruction unit adapted to send an instruction message and a verification token to a client device via a first communication network, wherein the instruction message comprises information pertaining to a modification of an industrial controller unit, and wherein the verification token pertains to a completed modification of the industrial controller unit. The server system further comprises a server receiving unit adapted to receive a verification message pertaining to the verification token, and a configuration unit adapted to provide an industrial program and/or a parameter for an industrial program to the industrial controller unit via a second communication network, in response to the verification message.

According to an embodiment, any two or three of the server instruction unit and the server receiving unit and the configuration unit may be provided in an integrated unit.

Alternatively, the server instruction unit and/or the server receiving unit may be spatially separated from the configuration unit, but communicatively coupled thereto.

According to the latter example, the functionalities of the server instruction unit and/or the server receiving unit may be relegated to a management system that can be spatially separated from the configuration unit adapted to provide the industrial control program and/or the parameters for the industrial control program to the industrial controller unit.

According to an embodiment, the server receiving unit may be further adapted to receive an identification message pertaining to an identity of the industrial controller unit.

In particular, the configuration unit may be adapted to provide the industrial program and/or the parameter for the industrial program to the industrial controller unit only in response to the identification message.

According to an embodiment, the server system may further comprise an authorization unit adapted to verify an authorization.

In particular, the authorization unit may be adapted to trigger the server instruction unit to send the instruction message to the client device only upon verifying the authorization.

In an example, the server system further comprises a monitoring unit adapted to detect an operating state of the industrial controller unit.

The monitoring unit may be further adapted to trigger the server instruction unit to automatically send the instruction message to the client device in response to the detected operating state.

According to an embodiment, the server system may further comprise a database unit storing the industrial program and/or the parameter for the industrial program.

The server instruction unit may be adapted to select the industrial program and/or the parameter for the industrial program in accordance with the verification message, from the database unit.

In the second aspect, the invention also relates to a client device, comprising: a client receiver unit adapted to receive an instruction message and a verification token from a server system via a first communication network, wherein the instruction message comprises information pertaining to a modification of an industrial controller unit, and wherein the verification token pertains to a completed modification of the industrial controller unit.

The client device further comprises a client verification unit adapted to send a verification message to the server system, wherein the verification message pertains to the verification token.

According to an embodiment, the client device further comprises an identification unit, wherein the identification unit is adapted to send an identification message to the server system, or is adapted to trigger the controller unit to provide an identification message to the server system, wherein the identification message pertains to an identity of the industrial controller unit.

The invention also relates to a system comprising the server system with some or all of the features described above, and the client device with some or all of the features described above, wherein the server system and the client device are connected via the first communication network.

BRIEF DESCRIPTION OF THE DRAWINGS

The features and numerous advantages of the method and system according to the present invention will be best understood from a detailed description of preferred embodiments with reference to the drawings, in which.

DETAILED DESCRIPTION

Methods and systems for an automated configuration of an industrial controller unit will now be described with reference to FIGS. 1 to 8 for the example of an industrial control environment 10 comprising a plurality of industrial controller units $12_1$ to $12_5$ that are connected to a server system 14 via a control network 16.

Figure 1:
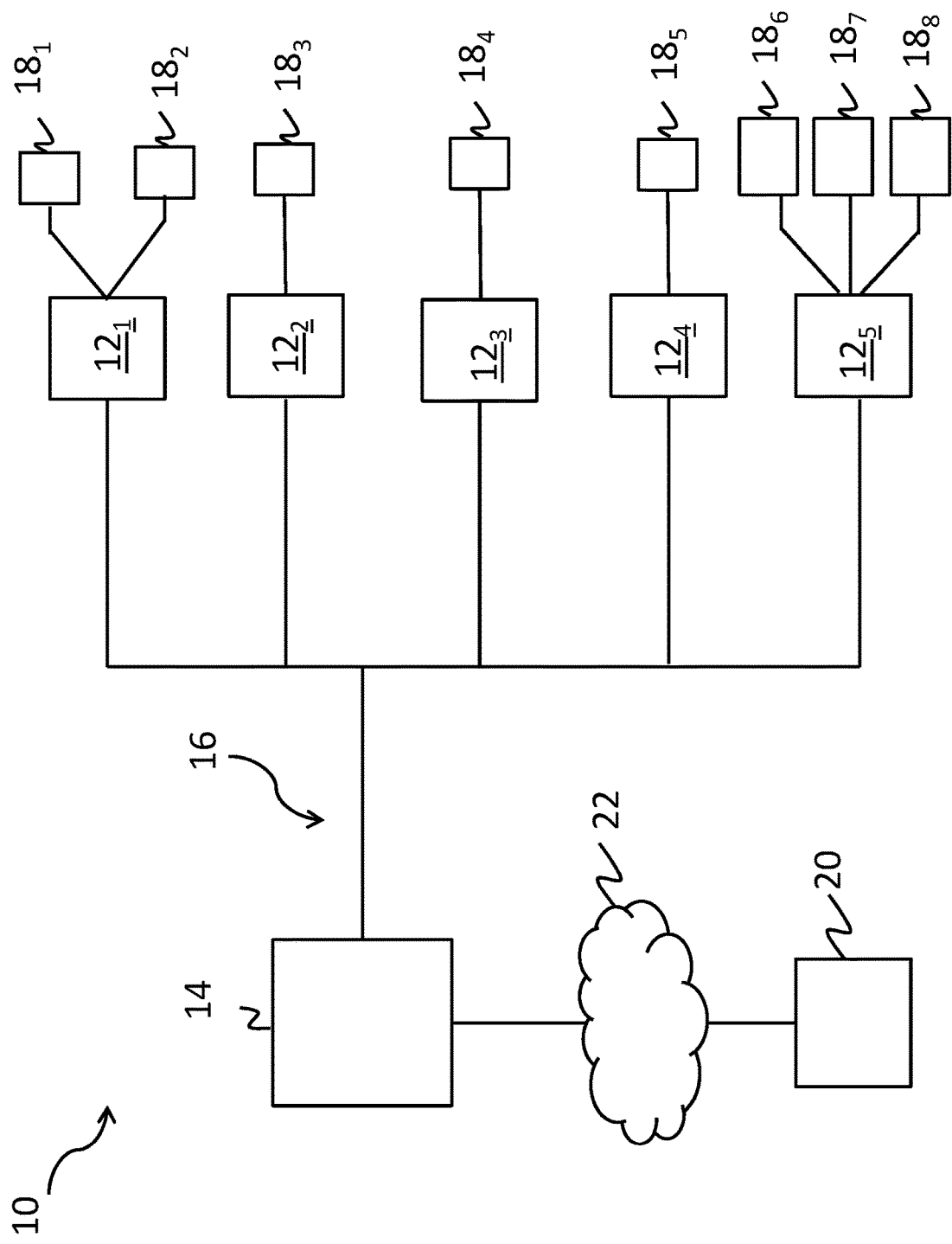
FIG. 1 is a schematic overview of an industrial control environment in which the method and system according to the present invention may be employed.

With reference to FIG. 1, the industrial control environment 10 may be a factory environment, and each of the industrial controller units $12_1$ to $12_5$ may control a machine or tool or group of machines or tools $18_1$ to $18_8$ connected to the industrial controller units $12_1$ to $12_5$ in the industrial control environment 10. Each of the industrial controller units $12_1$ to $12_5$ may be equipped with their own processor and memory (not shown) and may run an industrial control program for controlling the associated machine or tool $18_1$ to $18_8$. The control program may be stored locally in the memory of the respective industrial controller unit $12_1$ to $12_5$, such as in the form of compiled machine code or ladder logic instructions. The industrial control program may run on the processor of the respective industrial controller unit $12_1$ to $12_5$, and may rely on control parameters stored locally in the respective memory, or provided remotely from the server system 14 via the control network 16. These parameters may be recipe parameters or other input variables required by the control program for operation of the respective machines or tools $18_1$ to $18_8$. Moreover, each of the industrial controller units $12_1$ to $12_5$ may generate output variables or log files, and may store them locally in memory or upload them to the server system 14 over the control network 16.

The control network 16 may be any data network adapted for communication and data exchange back and forth between the industrial control units $12_1$ to $12_5$ and the server system 14, either wired or wireless or mixed. For instance, the control network 16 may be a local area network. If some of the industrial controller units $12_1$ to $12_5$ are located remotely, or distributed over a large area, the control network 16 could also be the internet.

FIG. 1 shows a configuration with five industrial controller units $12_1$ to $12_5$, wherein each of the industrial controller units $12_1$ to $12_5$ controls between one and three machines $18_1$ to $18_8$. However, this is for illustration only, and in practical implementations the industrial control environment 10 may comprise a single industrial controller unit or any number of industrial controller units, adapted to control a single or any number of machines or tools. It is a particular advantage of the methods and systems according to the present disclosure that they can simplify a configuration or reconfiguration of a large number of industrial controller units $12_1$ to $12_5$ from a single server system 14.

As can be further taken from FIG. 1, the control environment 10 additionally comprises a client device 20 that is connected to the server system 14 via a communication network 22.

The client device 20 may be a communication device, such as a tablet computer or mobile phone. The client device 20 may be employed by operating personnel in the commissioning or maintenance of the industrial controller units $12_1$ to $12_5$, as will be described in more detail below.

The communication network 22 may be a wired or wireless or mixed network. In some examples, the communication network 22 may be the internet.

While FIG. 1 shows the control network 16 and the communication network 22 as separate networks, this is for illustration and ease of presentation only, and in other examples the control network 16 and the communication network 22 may be identical, or partially identical.

Figure 2:
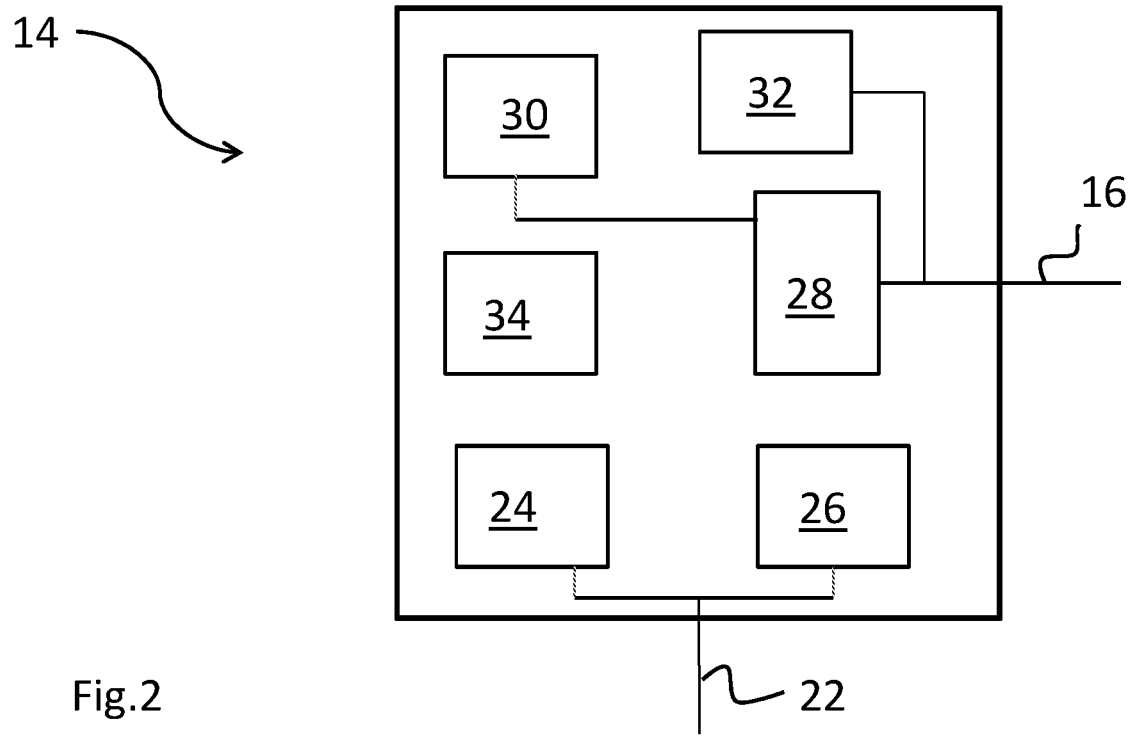
FIG. 2 is a schematic illustration of a server system according to an embodiment.

A schematic illustration that shows an embodiment of the server system 14 in additional detail is given in FIG. 2.

As can be taken from FIG. 2, the server system 14 comprises a server instruction unit 24, a server receiving unit 26, and a configuration unit 28.

The server instruction unit 24 is adapted to send an instruction message and a verification token to the client device 20 via the communication network 22. The instruction message may comprise information pertaining to a modification of an industrial controller unit, such as a sequence of work steps that a user may need to follow in order to re-configure one of the industrial controller units $12_1$ to $12_5$, or to replace one of the industrial controller units $12_1$ to $12_5$ with a different industrial controller unit.

The verification token may be employed by the client device 20 to generate a verification message that signals the completed modification. The server system 14 receives the verification message by means of the server receiving unit 26.

For instance, the verification token may comprise a text message with a confirmation link that is sent from the server instruction unit to the client device 20 via the communication network 22. Once the operating personnel have successfully completed the modification of the industrial controller unit $12_1$ to $12_5$ according to the instruction message, the operating personnel may confirm by responding to the text message. For instance, if the modification relates to an exchange of a dysfunctional industrial controller unit by a replacement industrial controller unit $12_1$, the instruction message may provide detailed instructions for the exchange of the industrial controller unit and commissioning the new industrial controller unit $12_1$ step-by-step, and the operating personnel may generate the verification message to signal to the server system 14 that all the work steps in the instruction message have been followed, and that the industrial controller unit $12_1$ has been successfully added to the control environment 10.

As can be taken from FIG. 2, the server receiving unit 26 is communicatively coupled to the configuration unit 28. Upon receiving the verification message, the server receiving unit 26 may trigger the configuration unit 28 to provide an industrial program and/or a parameter for an industrial program to the respective industrial controller unit, such as the industrial controller unit $12_1$, via the control network 16. In response to the verification message, the industrial controller unit $12_1$ is hence automatically provided with a dedicated industrial control program and/or corresponding parameters, without requiring additional interaction by the operating personnel.

In some examples, the server system 14 may further comprise a database unit 30 that is communicatively coupled to the configuration unit 28. The database unit 30 may store industrial programs and/or parameters for industrial programs for a large number of industrial controller units $12_1$ to $12_5$. The configuration unit 28 may configure the respective industrial controller unit $12_1$ by selecting the corresponding industrial control program and/or parameters from the database unit 30.

As can be further taken from FIG. 2, the server system 14 may additionally, in some examples, comprise a monitoring unit 32 that is coupled to the industrial controller units $12_1$ to $12_5$ by means of the control network 16. The monitoring unit 32 may monitor and detect an operating state of the industrial controller units $12_1$ to $12_5$. In response to a pre-determined condition being met, such as a malfunction occurring in one of the industrial controller units $12_1$ to $12_5$, the monitoring unit 32 may trigger the server instruction unit 24 to automatically send an instruction message to the client device 20. The instruction message may alert the operating personnel to replace the industrial controller unit $12_1$ to $12_5$ at which the malfunction occurred.

In other examples, the server system 14 additionally comprises an authorization unit 34 that is adapted to verify an authorization before triggering the server instruction unit 24 to send the instruction message to the client device 20. The authorization unit 34 may hence control access to the server system 14, and may guarantee that only authorized personnel may start a configuration or re-configuration/update of one of the industrial controller units $12_1$ to $12_5$.

For instance, authorization may be by means of password access, iris scan or other forms of identification.

FIG. 2 shows the server instruction unit 24, server receiving unit 26, configuration unit 28, database unit 30, monitoring unit 32, and authorization unit 34 as components of a single integrated server system unit 14. However, this is for illustration only, and in some applications any of these units may be located remotely.

Figure 3:
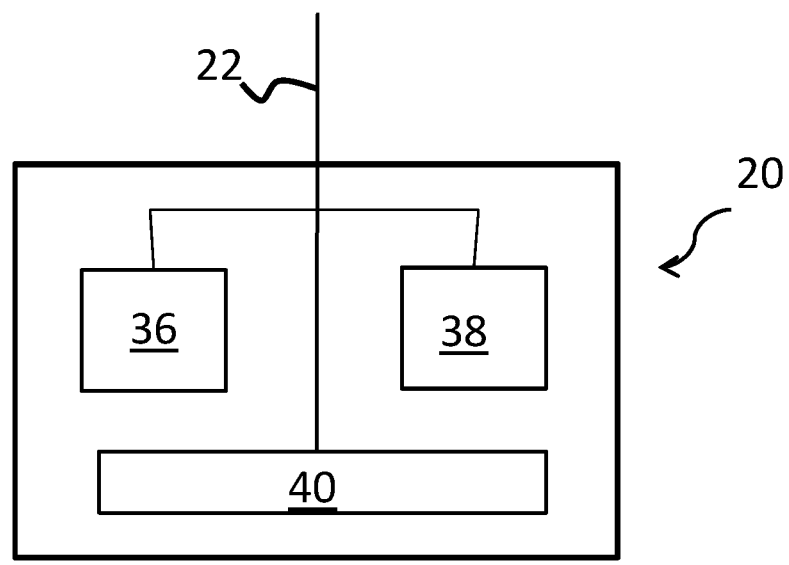
FIG. 3 is a schematic illustration of a client device according to an embodiment.

FIG. 3 is a schematic illustration of a client device 20 according to an embodiment.

As can be taken from FIG. 3, the client device 20 comprises a client receiver unit 36 adapted to receive the instruction message and the verification token from the server system 14 via the communication network 22.

The client device 20 may be adapted to display the received instruction message and/or the verification token on a display device (not shown), such as a monitor of the client device 20. The operating personnel may follow the work steps prescribed in the instruction message to modify one of the industrial controller units $12_1$ to $12_5$.

As can be further taken from FIG. 3, the client device additionally comprises a client verification unit 38. The client verification unit 38 may be adapted to send a verification message to the server system 14 via the communication network 22. The verification message may be received by the server receiving unit 26 and may signal to the server system 14 that the operating personnel has successfully completed the modification of the industrial controller unit $12_1$ to $12_5$.

In some examples, the client verification unit 38 may generate the verification message when the operating personnel clicks on a link in a text message or an e-mail. In other examples, the client verification unit 38 may generate the verification message when the user scans a one- or two-dimensional barcode provided to him as part of the instruction message.

As can be further taken from FIG. 3, in some examples the client device 20 may additionally comprise an identification unit 40. The identification unit 40 may be adapted to send an identification message to the server system 14 via the communication network 22, or may be adapted to trigger the controller unit $12_1$ to $12_5$ to provide an identification message to the server system via the control network 16.

In some examples, the identification unit 40 may generate the identification message based on a user input of the operating personnel, such as based on input of an identification number that the operating personnel has read off the housing of the respective industrial controller unit $12_1$ to $12_5$.

The identification message may comprise information pertaining to an identity of the industrial controller unit $12_1$ to $12_5$ that has been modified, and may hence assist the server system 14 in selecting the appropriate industrial program and/or parameters for the industrial controller unit $12_1$ to $12_5$ that has been modified.

Even in examples in which the verification token or verification message already comprises an identification of the respective industrial controller unit $12_1$ to $12_5$, the additional identification message may allow the server system 14 to double check that the operating personnel has chosen the correct industrial controller unit $12_1$ to $12_5$, in accordance with the instructions provided in the instruction message. This is particularly helpful in the scenario in which the operating personnel is provided with a large number of instruction messages pertaining to a large number of industrial controller units $12_1$ to $12_5$, such as when setting up or commissioning the control environment 10.

In other scenarios, only a single industrial controller unit $12_1$ to $12_5$ of the control environment 10 needs to be modified, such as to replace an industrial controller unit $12_1$ to $12_5$ that has become dysfunctional. In this scenario, it may be possible for the server system 14 to reliably identify the industrial controller unit $12_1$ to $12_5$ that has been modified by means of a network scan, and a separate identification by means of an identification message may not always be required.

The schematic illustration of FIG. 3 shows the client receiver unit 36, client verification unit 38, and identification unit 40 as components of a single integrated client device 20. However, this is for illustration only, and one or several of these units may be provided remotely.

Figure 4:
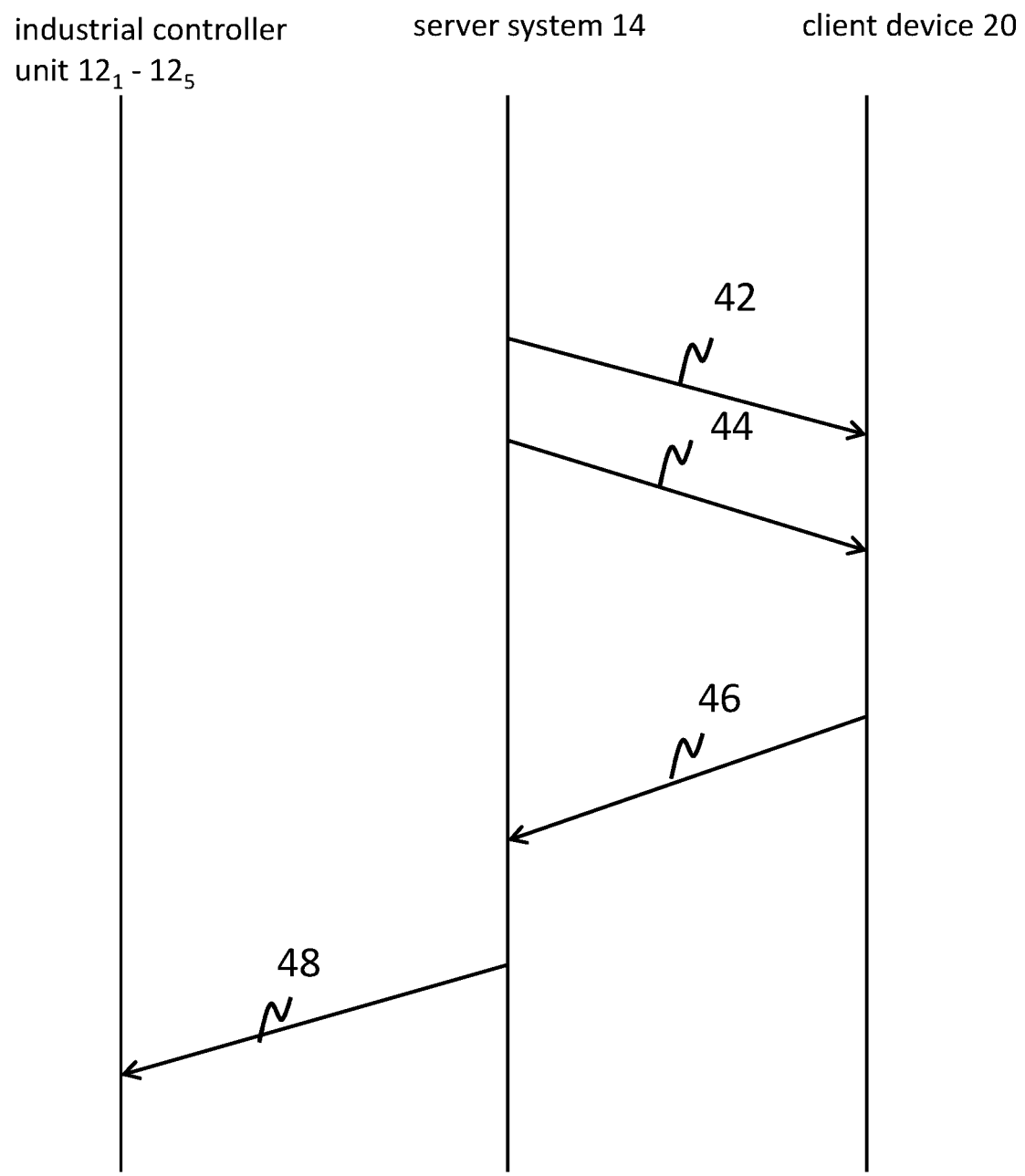
FIG. 4 is a flow diagram illustrating a chain of communications between an industrial controller unit, server system, and client device according to a first embodiment.

FIG. 4 is a schematic diagram that shows a chain of communications between the server system 14, client device 20, and controller unit $12_1$ to $12_5$ when the respective controller unit $12_1$ to $12_5$ is automatically configured according to an example of the present disclosure. Time flow is from top to bottom in FIG. 4.

The exemplary method starts with the server system 14 sending an instruction message 42 and a verification token 44 to the client device 20. FIG. 4 shows the instruction message 42 and the verification token 44 as separate messages. However, in other examples the instruction message 42 and the verification token 44 may also be combined into a single message, and may be sent simultaneously to the client device 20.

As explained above with reference to FIGS. 1 to 3, the instruction message 42 comprises information pertaining to a modification of the respective industrial controller unit $12_1$ to $12_5$, and the verification token 44 pertains to a completed modification of the respective industrial controller unit $12_1$ to $12_5$.

When the modification of the industrial controller unit $12_1$ to $12_5$ has been completed according to the instruction message 42, the client device 20 employs the verification total 44 to generate a verification message 46 and sends it to the server system 14. The verification message 46 signals to the server system 14 that the modification of the respective industrial controller unit $12_1$ to $12_5$ has been successfully completed by the operating personnel.

In response to receiving the verification message 46, the server system 14 may provide an industrial control program 48, such as a compiled industrial control program or ladder logic instructions, to the respective controller unit $12_1$ to $12_5$.

Alongside the industrial control program 48, the server system 14 may also provide parameters for the industrial control program 48 to the respective industrial controller unit $12_1$ to $12_5$.

Figure 5:
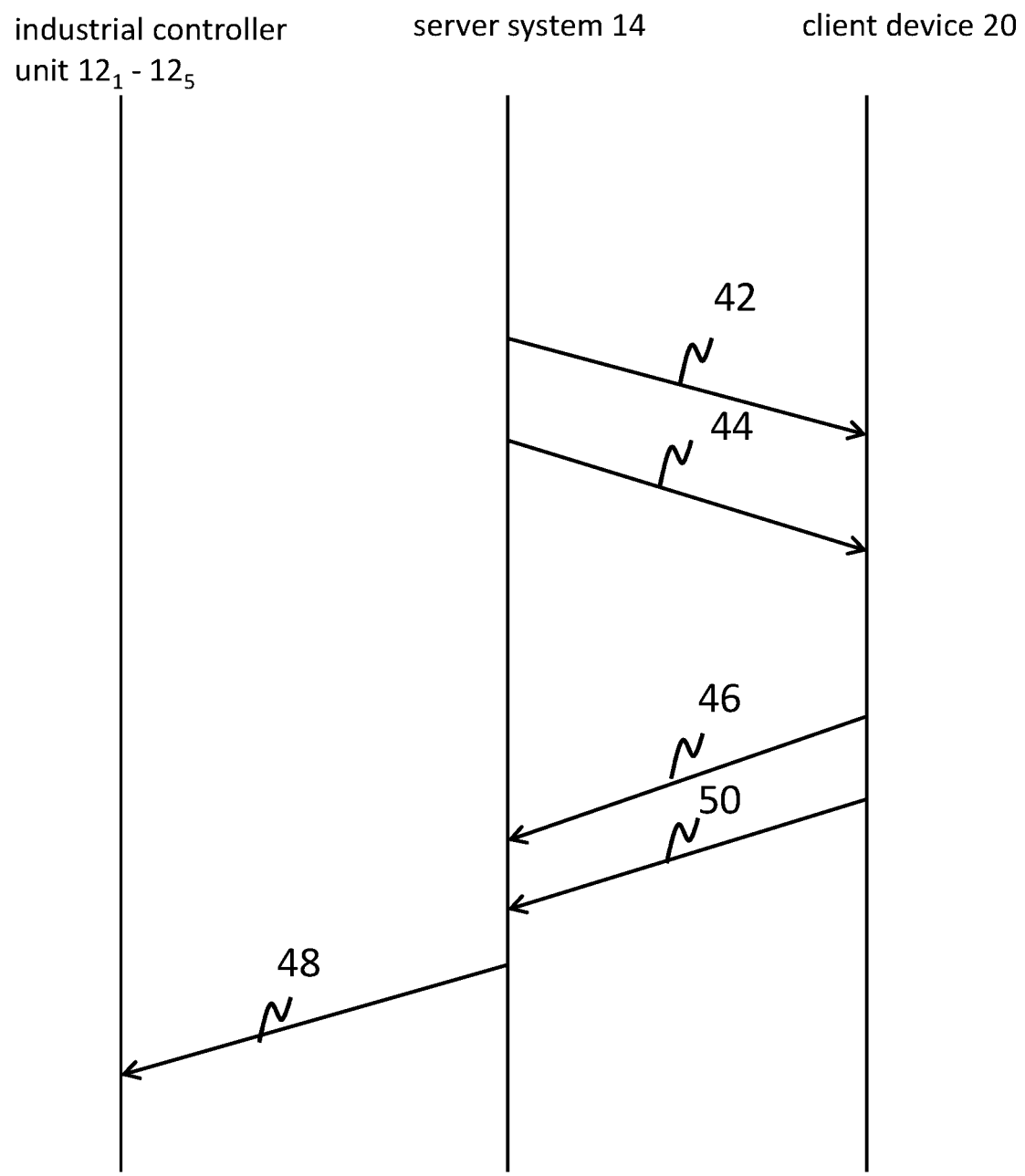
FIG. 5 is a flow diagram illustrating the communication chain between an industrial controller unit, server system, and client device according to a second embodiment.

FIG. 5 shows an example of a flow diagram that generally corresponds to the example described above with reference to FIG. 4. However, according to the example of FIG. 5, the client device 20 sends an additional identification message 50 to the server system 14 alongside the verification message 46.

As described above with reference to FIG. 3, the identification message 50 may contain information that allows the server system 14 to identify the industrial controller unit $12_1$ to $12_5$ that has been modified. The server system 14 may use this information to select the correct industrial program 48 and/or parameters for the industrial program 48 pertaining to the industrial controller unit $12_1$ to $12_5$ that has been modified.

Figure 6:
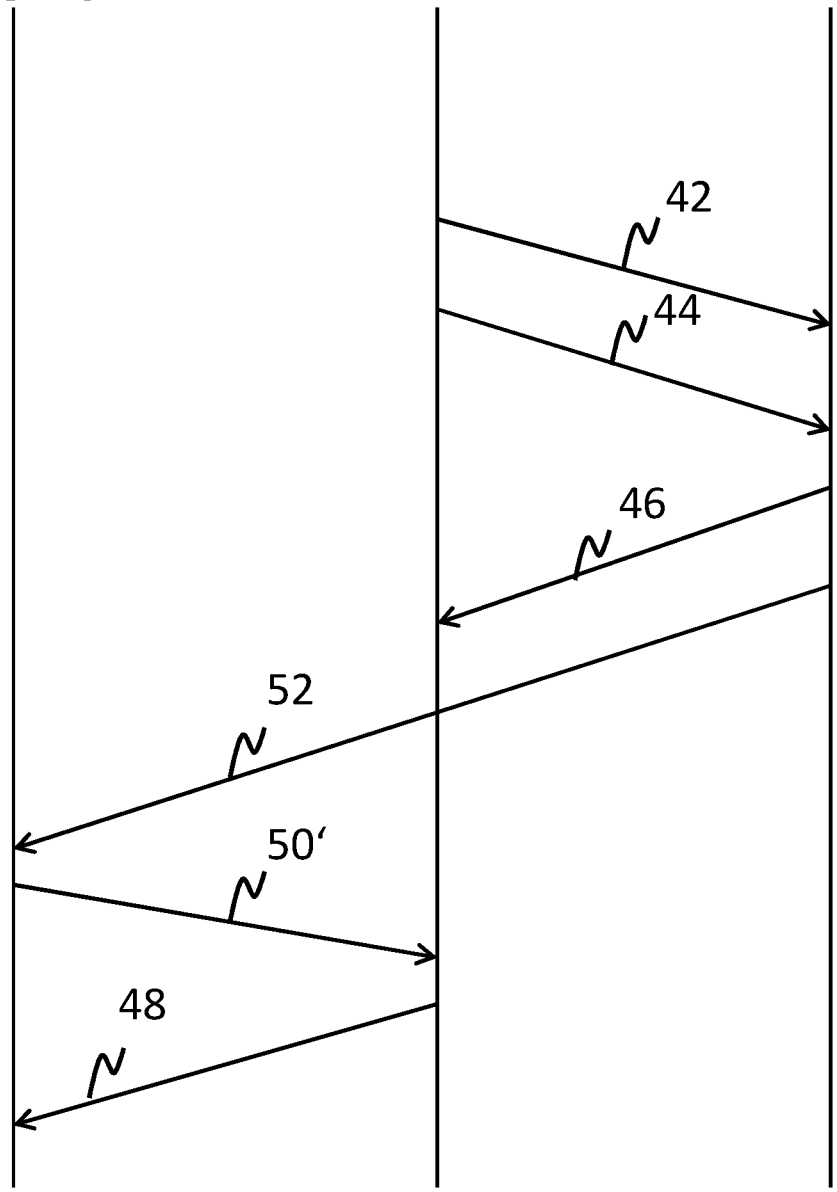
FIG. 6 is a flow diagram illustrating a communication chain between an industrial controller unit, server system, and client device according to a third embodiment employing a trigger message from the client device to the controller unit.

FIG. 6 is a schematic diagram illustrating a chain of communications between the industrial controller unit $12_1$ to $12_5$, the server system 14 and the client device 20 according to another example.

The diagram of FIG. 6 generally corresponds to the diagram described above with reference to FIG. 5. However, instead of the identification message 50 to the server system 14, the client device 20 sends a trigger message 52 to the industrial controller unit $12_1$ to $12_5$ The trigger message 52 triggers the industrial controller unit $12_1$ to $12_5$ to send an identification message 50' to the server system 14. Similar to the identification message 50, the identification message 50' comprises information pertaining to the identity of the respective industrial controller unit $12_1$ to $12_5$, and helps the server system 14 to select the correct industrial program 48 pertaining to the respective industrial controller unit $12_1$ to $12_5$.

Figure 7:
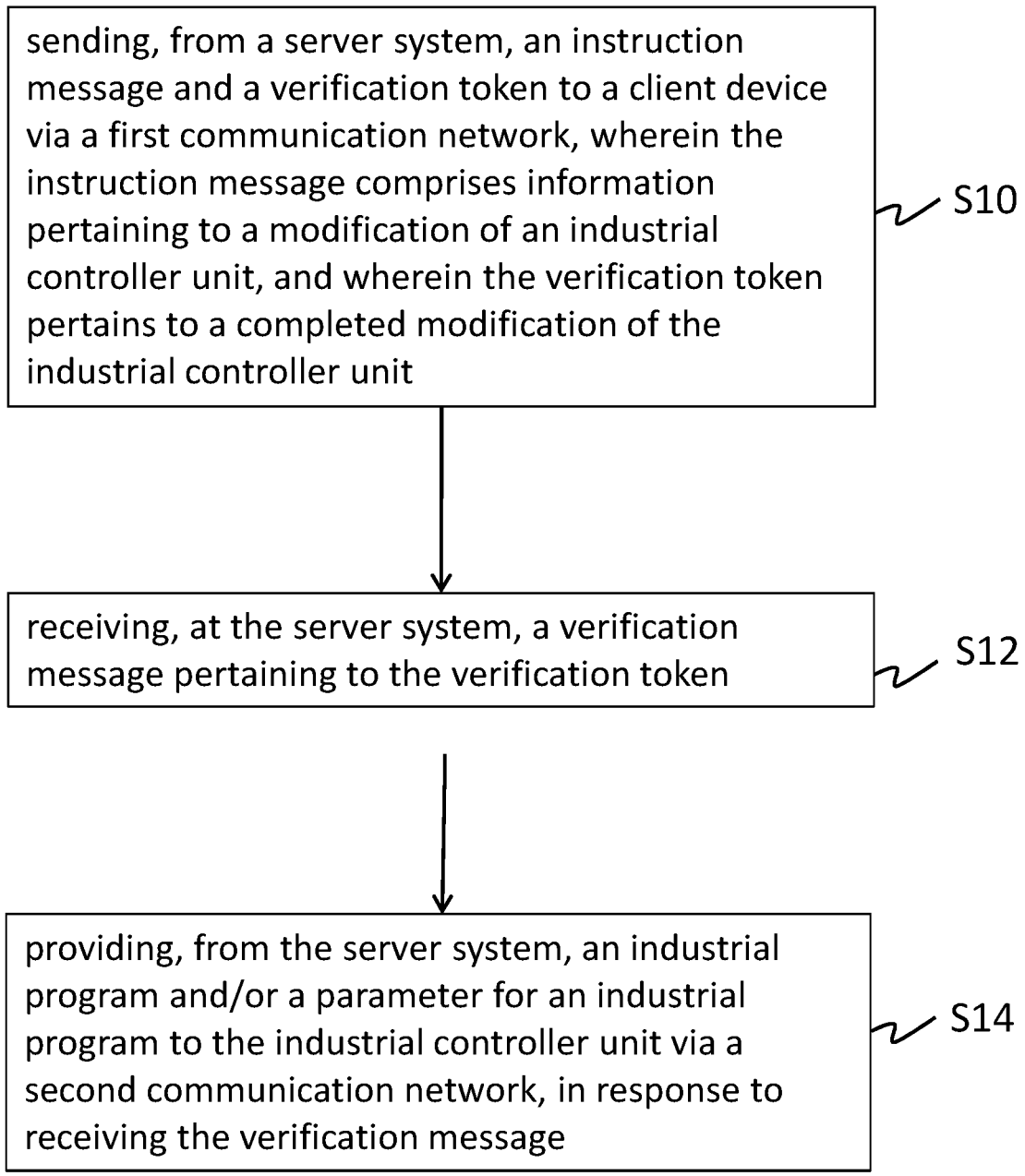
FIG. 7 is a flow diagram illustrating a method for an automatic configuration of an industrial controller unit implemented on a server system according to an embodiment.

FIG. 7 is a flow diagram illustrating a method for an automated configuration of an industrial controller from the perspective of a server system.

In a first step S10, the server system sends an instruction message and a verification token to a client device via a first communication network. The instruction message comprises information pertaining to a modification of an industrial controller unit, and the verification token pertains to a completed modification of the industrial controller unit.

In a second step S12, the server system receives a verification message pertaining to the verification token.

In a third step S14, the server system provides an industrial program and/or a parameter for an industrial program to the industrial controller unit via a second communication network, in response to receiving the verification message in step S12.

Figure 8:
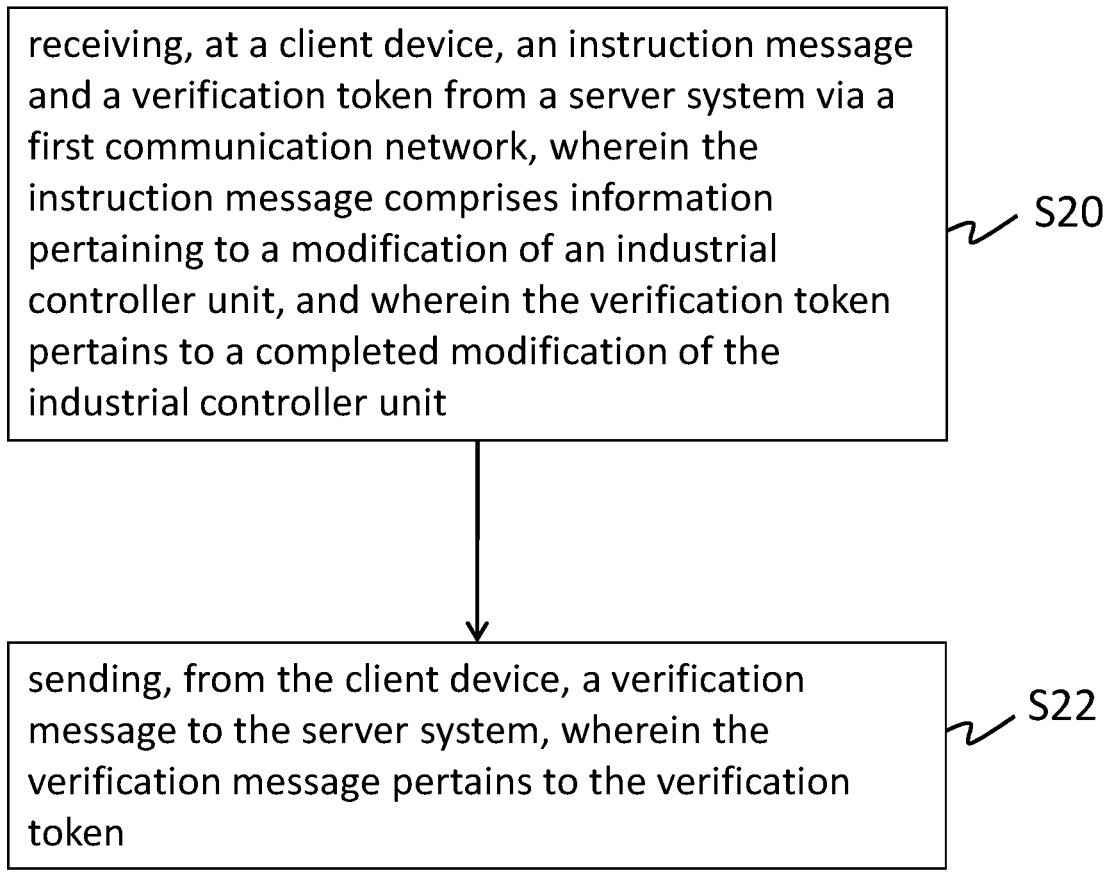
FIG. 8 is a flow diagram illustrating a method for an automatic configuration of an industrial controller unit implemented on a client device according to an embodiment.

FIG. 8 is a schematic illustration of an example of a method for an automated configuration of an industrial controller unit from the complementary perspective of a client device.

In a first step S20, the client device receives an instruction message and a verification token from a server system via a first communication network. The instruction message comprises information pertaining to a modification of an industrial controller unit, and the verification token pertains to a completed modification of the industrial controller unit.

In a second step S22, the client device sends a verification message to the server system, wherein the verification message pertains to the verification token.

The description of the embodiments and the Figures merely serves for illustrating examples of the invention and the numerous advantages resulting therefrom, but should not be understood to imply any limitation.

REFERENCE SIGNS 10 control environment
$12_1$-$12_5$ industrial controller units
14 server system
16 control network
$18_1$-$18_8$ machines/tools
20 client device
22 communication network
24 server instruction unit
26 server receiving unit
28 configuration unit
30 database unit
32 monitoring unit
34 authorization unit
36 client receiver unit
38 client verification unit
40 identification unit
42 instruction message
44 verification token
46 verification message
48 industrial program
50, 50' identification message
52 trigger message

The invention claimed is:

1. A method for an automated configuration of an industrial controller unit, comprising:
    sending, from a server system, an instruction message and a verification token to a client device via a first communication network wherein the instruction message comprises information pertaining to a modification of an industrial controller unit, and wherein the verification token pertains to a completed modification of the industrial controller unit;
    receiving, at the server system, a verification message pertaining to the verification token, wherein the verification message is a message based on or employing the verification token received from the server system, and is adapted to signal to the server system the completed modification of the industrial controller unit; and
    providing, from the server system, an industrial program and/or a parameter for an industrial program to the industrial controller unit via a second communication network, in response to receiving the verification message.

2. The method according to claim 1, further comprising receiving, at the server system, an identification message pertaining to an identity of the industrial controller unit and providing the industrial program and/or the parameter for the industrial program to the industrial controller unit only in response to receiving the identification message.

3. The method according to claim 1 further comprising verifying an authorization and sending the instruction message and/or the verification token to the client device only upon verifying the authorization.

4. The method according to claim 1, further comprising detecting an operating state of the industrial controller unit and sending the instruction message and/or the verification token to the client device in response to detecting the operating state.

5. The method according to claim 1, wherein the verification token comprises a barcode.

6. The method according to claim 1, wherein the industrial program and/or the parameter for the industrial program is provided to the industrial controller unit automatically in response to receiving the verification message.

7. The method according to claim 1, further comprising selecting the industrial program and/or the parameter for the industrial program in accordance with the verification message, in particular from a database.

8. A method for an automated configuration of an industrial controller unit, comprising:
    receiving, at a client device, an instruction message and a verification token from a server system via a first communication network, wherein the instruction message comprises information pertaining to a modification of an industrial controller unit, and wherein the verification token pertains to a completed modification of the industrial controller unit;
    sending, from the client device, a verification message to the server system, wherein the verification message pertains to the verification token; and
    wherein the verification message is a message based on or employing the verification token received from the server system, and is adapted to signal to the server system the completed modification of the industrial controller unit, and is adapted to cause the server system to provide an industrial program and/or a parameter for an industrial program from the server system to the industrial controller unit via a second communication network.

9. The method according to claim 8, further comprising sending, from the client device, an identification message to the server system, wherein the identification message pertains to an identity of the industrial controller unit.

10. The method according to claim 8, further comprising triggering the controller unit to provide an identification message to the server system herein the identification message pertains to an identity of the industrial controller unit.

* * * * *